United States Patent
Hong et al.

(10) Patent No.: US 10,290,882 B2
(45) Date of Patent: May 14, 2019

(54) METHOD AND APPARATUS FOR CONTROLLING PUMP SPEED OF REDOX FLOW BATTERY

(71) Applicant: OCI COMPANY LTD., Seoul (KR)

(72) Inventors: Min-Ki Hong, Seongnam-si (KR); Eun-Sun Oh, Seongnam-si (KR); Hee-Chang Ye, Seongnam-si (KR); Byung-Chul Kim, Seongnam-si (KR); Soo-Whan Kim, Seongnam-si (KR)

(73) Assignee: OCI COMPANY LTD., Seoul (KR)

( * ) Notice: Subject to any disclaimer, the term of this patent is extended or adjusted under 35 U.S.C. 154(b) by 170 days.

(21) Appl. No.: 15/535,619

(22) PCT Filed: Dec. 16, 2015

(86) PCT No.: PCT/KR2015/013828
§ 371 (c)(1),
(2) Date: Jun. 13, 2017

(87) PCT Pub. No.: WO2016/099161
PCT Pub. Date: Jun. 23, 2016

(65) Prior Publication Data
US 2017/0346114 A1   Nov. 30, 2017

(30) Foreign Application Priority Data

Dec. 16, 2014 (KR) .......................... 10-2014-0180967

(51) Int. Cl.
*H01M 8/04276* (2016.01)
*H01M 8/04537* (2016.01)
(Continued)

(52) U.S. Cl.
CPC ..... *H01M 8/04276* (2013.01); *H01M 8/0482* (2013.01); *H01M 8/04611* (2013.01);
(Continued)

(58) Field of Classification Search
CPC ......... H01M 8/04276; H01M 8/04604; H01M 8/04611; H01M 8/04925; H01M 8/04923
See application file for complete search history.

(56) References Cited

U.S. PATENT DOCUMENTS

2005/0158614 A1*  7/2005  Hennessy .............. H01M 8/20
                                                            429/61
2010/0323264 A1* 12/2010  Chiang ............... B60L 11/1816
                                                            429/449
(Continued)

FOREIGN PATENT DOCUMENTS

JP        2008527647 A     7/2008
KR     1020070039359 A     4/2007
(Continued)

OTHER PUBLICATIONS

Krieger et al., ("Effects of variability and rate on battery charge storage and lifespan", Princeton University, Dissertation, Published Jan. 1, 2014) (Year: 2014).*
Yu et al., ("Peak power prediction of a vanadium redox flow battery", Journal of Power Sources (2014), 268, 261-268) (Year: 2014).*
(Continued)

*Primary Examiner* — Jeremiah R Smith
(74) *Attorney, Agent, or Firm* — Hauptman Ham, LLP (57) ABSTRACT

According to one embodiment of the present invention, the method for controlling the pump speed of a redox flow battery for transferring an electrolyte stored in an electrolyte tank to a cell stack comprises the steps of: measuring the input power and/or the output power of the redox flow battery; measuring the charging power and/or the discharging power of the redox flow battery; calculating the power loss of the redox flow battery by using the difference between the input power and the charging power, or the difference between the output power and the discharging power; and adjusting the pump speed according to the power loss.

10 Claims, 6 Drawing Sheets

(51) Int. Cl.
*H01M 8/18* (2006.01)
*H01M 8/04791* (2016.01)
*H01M 8/04858* (2016.01)
*H01M 8/04186* (2016.01)

(52) U.S. Cl.
CPC ........ *H01M 8/188* (2013.01); *H01M 8/04186* (2013.01); *H01M 8/04604* (2013.01); *H01M 8/04925* (2013.01); *H01M 8/04932* (2013.01); *Y02E 60/528* (2013.01)

(56) References Cited

U.S. PATENT DOCUMENTS

2014/0060666 A1* 3/2014 Evans .................. H01M 2/361
  137/260
2014/0220463 A1* 8/2014 Daniel .............. H01M 8/04276
  429/415
2016/0049673 A1* 2/2016 Fukushima ........... H01M 8/188
  429/429

FOREIGN PATENT DOCUMENTS

| KR | 1020110125415 A | 11/2011 |
| KR | 1020140080567 A | 7/2014 |
| KR | 101438123 B1 | 9/2014 |

OTHER PUBLICATIONS

International Search Report for PCT/KR2015/013828 dated Mar. 8, 2016.

* cited by examiner

METHOD AND APPARATUS FOR CONTROLLING PUMP SPEED OF REDOX FLOW BATTERY

CROSS REFERENCE TO RELATED APPLICATION

This present application is a national stage filing under 35 U.S.C § 371 of PCT application number PCT/KR2015/013828 filed on Dec. 16, 2015 which is based upon and claims the benefit of priority to Korean Patent Application No. 10-2014-0180967 filed on Dec. 16, 2014 in the Korean Intellectual Property Office. The disclosures of the above-listed applications are hereby incorporated by reference herein in their entirety.

BACKGROUND

1. Technical Field

The present disclosure relates to a method and apparatus for controlling a pump speed of a redox flow battery.

2. Description of the Related Art

General secondary batteries convert input electric energy to chemical energy and store the converted energy in a charge process, and convert the stored chemical energy to electric energy and output the converted electric energy in a discharge process.

Redox flow batteries, like the general secondary batteries, convert input electric energy to chemical energy and store the converted energy in a charge process, and convert the stored chemical energy to electric energy and output the converted electric energy in a discharge process. However, the redox flow battery is different from the general secondary battery in that an electrolyte keeping energy is stored in a separate tank. Furthermore, in order to supply the electrolyte stored in the tank to a cell stack, a separate pump needs to be installed on a pipe connecting the tank to the electrolyte.

Figure 1:
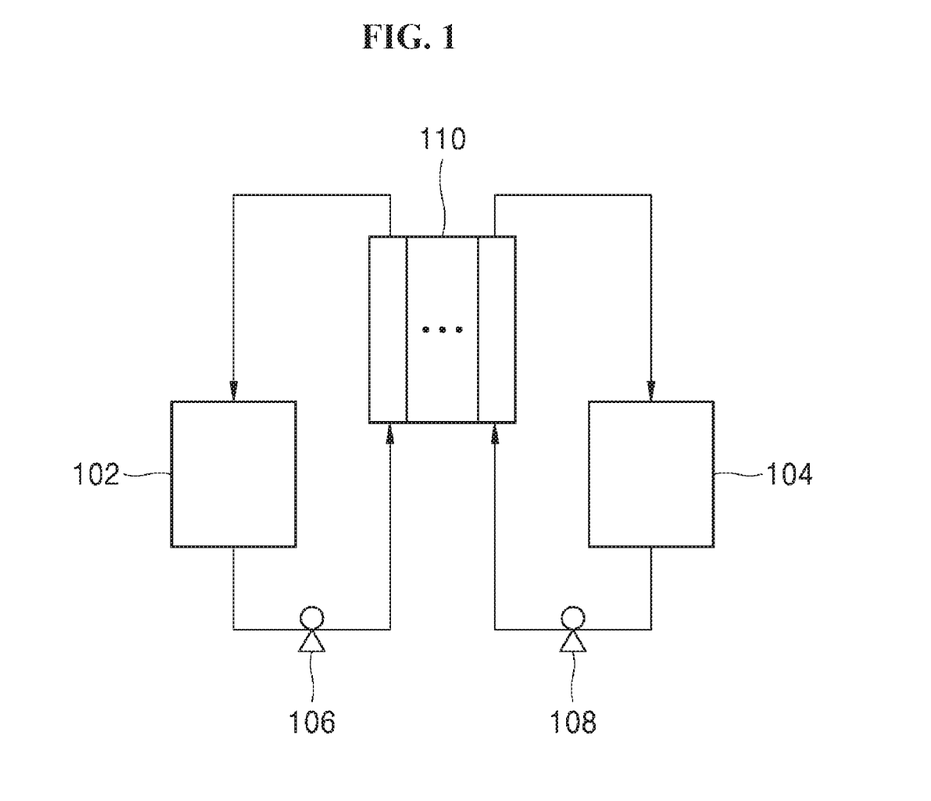
FIG. 1 illustrates a configuration of a redox flow battery system according to the related art.

FIG. 1 illustrates a configuration of a redox flow battery system according to the related art. Referring to FIG. 1, a redox flow battery may include a first tank 102 storing a first electrolyte, a second tank 104 storing a second electrolyte, and a cell stack 110 where charge and discharge of energy occur through an oxidation-reduction reaction using the first electrolyte and the second electrolyte transferred from the first tank 102 and the second tank 104. Furthermore, in order to supply the electrolytes from the first tank 102 and the second tank 104 to the cell stack 110, a first pump 106 is installed on a pipe connecting the first tank 102 to the cell stack 110, and a second pump 108 is installed on a pipe connecting the second tank 104 to the cell stack 110.

To improve efficiency of the redox flow battery system having the configuration of FIG. 1, it is important to minimize power consumption by additional devices such as the first and second pumps 106 and 108. In particular, the first and second pumps 106 and 108, which are essential devices to supply the electrolyte, consume the largest portion of power among additional devices. Since a power loss in the cell stack 110 is affected by a flow rate of the supplied electrolyte, it may be a problem that the speed of the pump cannot be unilaterally decreased or increased. In general, when the flow rate of electrolyte supplied to the cell stack 110 increases due to an increase in the speeds of the first and second pumps 106 and 108, while the power consumption of the first and second pumps 106 and 108 increases, the power loss in the cell stack 110 decreases. Reversely, while the power consumption of the first and second pumps 106 and 108 decreases, the power loss in the cell stack 110 increases.

In consideration of the above, there has been a demand for an improved method of controlling a pump speed to improve power efficiency of the redox flow battery system.

SUMMARY

It is an object of the present disclosure to maximize power efficiency of a redox flow battery system by controlling a pump speed and a supply amount of an electrolyte according thereto to minimize a power loss of the redox flow battery system.

The technical problems of the present disclosure are not limited to the above-mentioned technical objects, and other technical objects which are not mentioned can be clearly understood by those skilled in the art from the following description.

In accordance with one aspect of the present disclosure, a method of controlling a pump speed of a redox flow battery for transferring an electrolyte stored in an electrolyte tank to a cell stack, which includes measuring at least one of an input power and an output power of the redox flow battery, measuring at least one of a charging power and a discharging power of the redox flow battery, calculating a power loss of the redox flow battery by using a difference between the input power and the charging power or a difference between the output power and the discharging power, and adjusting the pump speed according to the power loss.

The adjusting, of the pump speed may include increasing the pump speed, comparing a first power loss before the increasing of the pump speed and a second power loss after the increasing of the pump speed, and increasing the pump speed when the first power loss is greater than the second power loss, and decreasing the pump speed when the first power loss is less than or equal to the second power loss.

The adjusting of the pump speed may include decreasing the pump speed, comparing a first power loss before the decreasing of the pump speed and a second power loss after the decreasing of the pump speed, and decreasing the pump speed when the first power loss is greater than the second power loss, and increasing the pump speed when the first power loss is less than or equal to the second power loss.

The adjusting of the pump speed may include maintaining an existing pump speed when the power loss is less than or equal to a preset first lost power, and allowing a change of the pump speed only when the power loss is greater than or equal to a preset second lost power.

The adjusting of the pump speed may include terminating charging or discharge of the redox flow battery when the pump speed reaches a preset upper limit speed, and maintaining an existing pump speed when the pump speed reaches a preset lower limit speed and the power loss decreases less than a preset third reference power.

In accordance with another aspect of the present disclosure, an apparatus for controlling a pump speed of a redox flow battery for transferring an electrolyte stored in an electrolyte tank to a cell stack, which includes a measuring unit measuring at least one of an input power and an output power of the redox flow battery and measuring at least one of a charging power and a discharging power of the redox flow battery, a calculation unit calculating a power loss of the redox flow battery by using a difference between the input power and the charging power or a difference between the output power and the discharging power, and a controller adjusting the pump speed according to the power loss.

The controller may increase the pump speed, compare a first power loss before the increasing of the pump speed and a second power loss after the increasing of the pump speed, increase the pump speed when the first power loss is greater than the second power loss, and decrease the pump speed when the first power loss is less than or equal to the second power loss.

The controller may decrease the pump speed, compare a first power loss before the decreasing of the pump speed and a second power loss after the decreasing of the pump speed, decrease the pump speed when the first power loss is greater than the second power loss, and increase the pump speed when the first power loss is less than or equal to the second power loss.

The controller may maintain an existing pump speed when the power loss is less than or equal to a preset first lost power, and allow a change of the pump speed only when the power loss is greater than or equal to a preset second lost power.

The controller may terminate charging or discharge of the redox flow battery when the pump speed reaches a preset upper limit speed, and maintain an existing pump speed when the pump speed reaches a preset lower limit speed and the power loss decreases less than a preset third reference power.

According to the present disclosure, power efficiency of a redox flow battery system may be maximized by controlling a pump speed and a supply amount of an electrolyte according thereto to minimize a power loss of the redox flow battery system.

DETAILED DESCRIPTION

The above objects, features and advantages will become apparent from the detailed description with reference to the accompanying drawings. Embodiments are described in sufficient detail to enable those skilled in the art in the art to easily practice the technical idea of the present disclosure. Detailed descriptions of well-known functions or configurations may be omitted in order not to unnecessarily obscure the gist of the present disclosure. Hereinafter, embodiments of the present disclosure will be described in detail with reference to the accompanying drawings. Throughout the drawings, like reference numerals refer to like elements.

Figure 2:
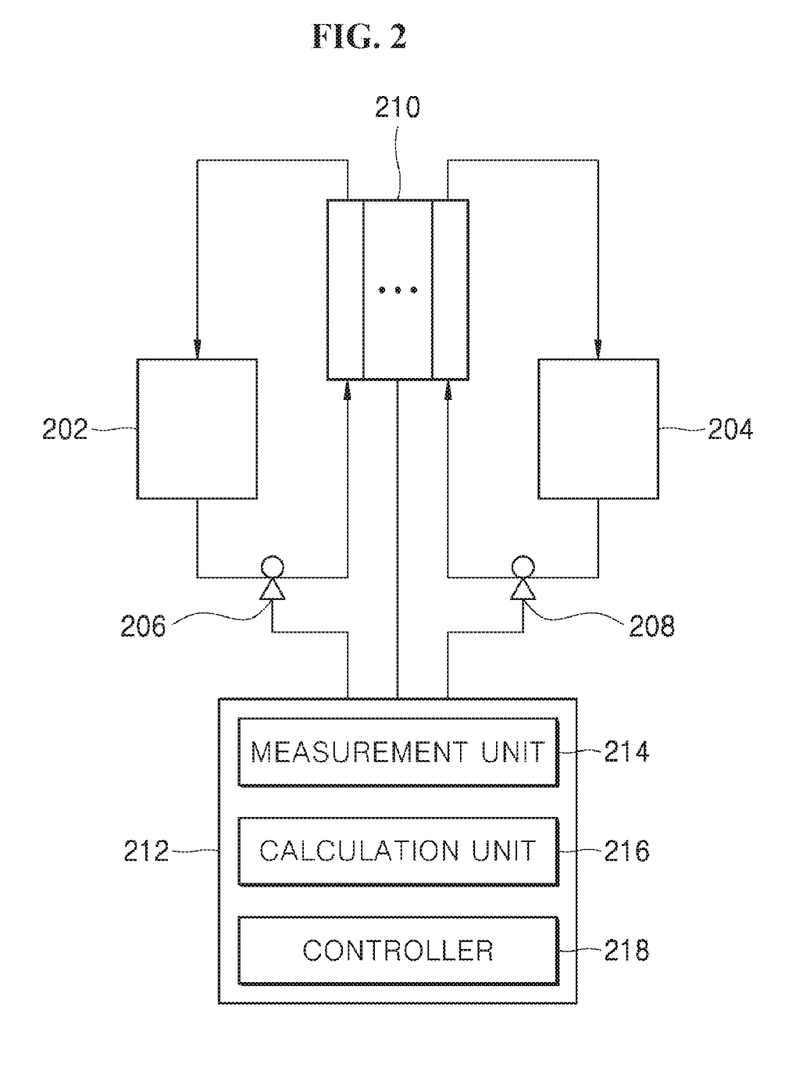
FIG. 2 illustrates a configuration of a redox flow battery system and a pump speed controller according to an embodiment.

FIG. 2 illustrates a configuration of a redox flow battery system and a pump speed controller according to an embodiment. Referring to FIG. 2, a redox flow battery according to an embodiment may include a first tank 202 storing a first electrolyte, a second tank 204 storing a second electrolyte, a cell stack 210 where charge and discharge of power occur through an oxidation-reduction reaction using the first electrolyte and the second electrolyte transferred from the first tank 202 and the second tank 204. The cell stack 210 may include a plurality of cells.

Furthermore, to supply the electrolytes from the first tank 202 and the second tank 204 to the cell stack 210, a first pump 206 is installed on a pipe connecting the first tank 202 to the cell stack 210, and a second pump 208 is installed on a pipe connecting the second tank 204 to the cell stack 210. In the present disclosure, when speeds of the first and second pumps 206 and 208 increase, a flow rate of the electrodes supplied from the first and second tanks 202 and 204 to the cell stack 210 increases. Reversely, when speeds of the first and second pumps 206 and 208 decrease, the flow rate of the electrodes supplied from the first and second tanks 202 and 204 to the cell stack 210 decreases.

Referring back to FIG. 2, according to the present embodiment, a pump speed controller 212 may include a measurement unit 214, a calculation unit 216, and a controller 218.

The measurement unit 214 is connected to the redox flow battery and may measure or calculate input power, output power, charging power, and discharging power of the redox flow battery. In the present disclosure, when the redox flow battery operates in a charge mode, the input power may be defined to be a total amount of power supplied to the redox flow battery during charging, and the charging power may be defined to be power actually charged in the battery. Furthermore, when the redox flow battery operates in a discharge mode, the output power may be defined to be a total amount of power discharged from the redox flow battery to the outside during discharge, and the discharging power may be defined to be an amount of power that is actually discharged from the battery. In the present disclosure, the charging power or the discharging power signify power reflecting only a state of charge (SOC) change, excluding a power loss due to the internal resistance of the redox flow battery and additional devices such as pumps.

Furthermore, the measurement unit 214 may measure amounts of a voltage and current applied to the cell stack 210, an open-circuit voltage of the cell stack 210, speeds or power consumption amounts of the first and second pumps 206 and 208.

The calculation unit 216 may measure a power loss of a redox flow battery by using the input power and the charging power, or the output power and the discharging power, which are measured by the measurement unit 214.

The controller 218 may control the speeds of the first and second pumps 206 and 208 of the redox flow battery according to the power loss calculated by the measurement unit 214. The flow rates of the electrolytes flowing into the cell stack 210 from the first and second tanks 202 and 204 are adjusted according to the pump speed control of the controller 218.

In the following description, a method of controlling a pump speed of a redox flow battery according to an embodiment is described in detail with reference to FIG. 2.

The power loss of an overall redox flow battery system of FIG. 2 may be determined according to a difference between the input power supplied to the redox flow battery from the outside and the charging power that is actually charged in the redox flow battery, or a difference between the output power discharged from the redox flow battery to the outside and the discharging power discharged from the redox flow battery. When the redox flow battery operates in the charge mode, the input power may be defined to be a total amount of power supplied to the redox flow battery during charging, and the charging power may be defined to be power actually charged in the battery. Furthermore, when the redox flow battery operates in the discharge mode, the output power may be defined to be a total amount of power discharged from the redox flow battery to the outside during discharge, and the discharging power may be defined to be an amount of power that is actually discharged from the battery.

In other words, the power loss of the redox flow battery system during charging may be defined by Equation 1 below.

System Power Loss (P)=Input Power (B)−Charging power (A)=Stack Power Loss (Power loss occurred in a stack)+Additional Device Power Consumption (Amount of power consumption by an additional device such as a pump)  [Equation 1]

Furthermore, the power loss of the redox flow battery system during discharge may be defined by Equation 2 below.

System Power Loss (P)=Discharging power (C)−Output Power (D)=Stack Power Loss+Additional Device Power Consumption  [Equation 2]

In the redox flow battery system of FIG. 2, Input Power (B) or Output Power (D) may be measured by the measurement unit 214. Charging power (A) or Discharging power (C) may be obtained from a product of an open-circuit voltage of the cell stack 210 measured by the measurement unit 214 and current applied to the cell stack 210, as expressed below.

Charging power (A)=Open-Circuit Voltage (Ocv)×Current (I)  [Equation 3]

Discharging power (C)=Open-Circuit Voltage (Ocv)×Current (I)  [Equation 4]

The cell stack 210 according to the present embodiment may include a plurality of unit cells. When an open-circuit voltage (cell voltage) with respect to specific unit cells of all unit cells forming the cell stack 210 is measured and used, a charging power (A) may be defined as follows.

Charging power (A)=Open-Circuit Voltage (Ocv)×Current (I)×{Number of cells serially connected in a stack (ST)/Number of serially connected cells subject to OCV measurement (SI)}  [Equation 5]

For example, when power of 100 W is supplied from the outside during the charge of the redox flow battery system of FIG. 2, the current of the cell stack 210 is 10 A, the open-circuit voltage of one unit cell of the cell stack 210 including ten unit cells is 0.8V, System Power Loss (P) may be calculated as follows.

P=B−A=100 W−(0.8 V×10 A×(10/1))=20 W  [Equation 6]

In other words, in this case, an amount of 20 W corresponds to the power loss consumed due to heat generation or operation of additional devices such as the first and second pumps 206 and 208.

Figure 3:
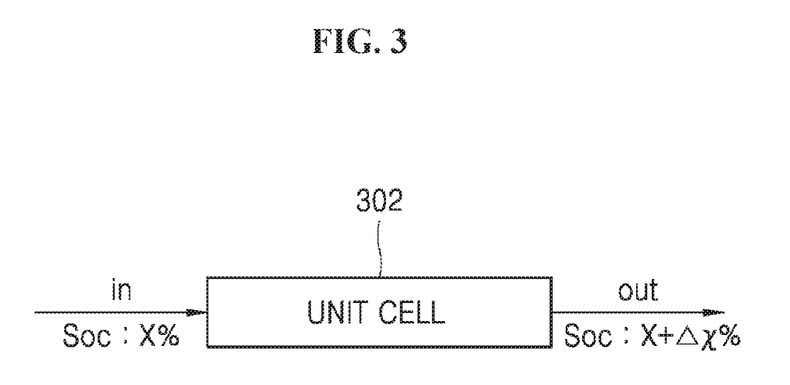
FIG. 3 is a block diagram for explaining a state of charge (SOC) change of an electrolyte input to a unit cell and an electrolyte output from the unit cell.

FIG. 3 is a block diagram for explaining an SOC change of an electrolyte input to a unit cell and an electrolyte output from the unit cell.

FIG. 3 illustrates a unit cell 302 forming the cell stack 210. The electrolytes stored in the first and second tanks 202 and 204 are input to the unit cell 302 by the first and second pumps 206 and 208, and are output from the unit cell 302 after completing an oxidation-reduction reaction. In this state, assuming that an SOC of the input electrolyte is x %, an SOC of the output electrolyte is (x+Δx) %. A difference Δx between the SOC of the electrolyte input to the unit cell 302 and the SOC of the electrolyte output from the unit cell 302 may be expressed as follows.

Δx ∝(Current applied to a unit cell/Pump speed)  [Equation 7]

For example, when the redox flow battery system operates in the charge mode, if the SOC of the electrolyte input to the unit cell 302 reflects the state of the electrolyte that is currently charged, the SOC of the electrolyte output from the unit cell 302 reflects power needed for charging. Assuming that the electrolyte is charged by applying a certain amount of current to the unit cell 302, if the first and second pumps 206 and 208 supply the electrolyte to the unit cell 302 at a sufficiently high speed, an SOC difference between the input electrolyte and the output electrolyte may be close to zero (0), and as the speeds of the first and second pumps 205 and 208 get lower, the SOC difference between the input electrolyte and the output electrolyte may increase further.

Figure 4:
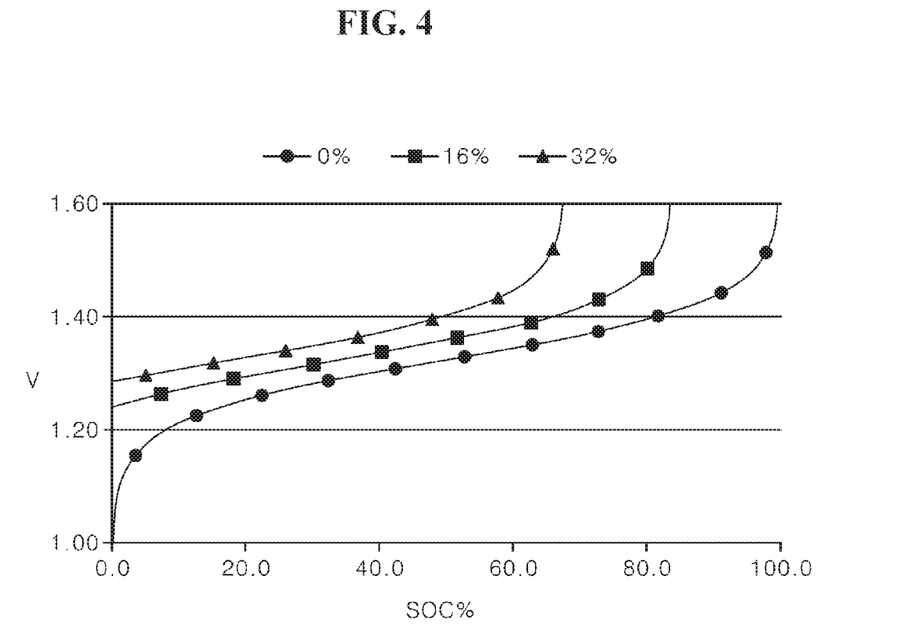
FIG. 4 is a graph showing a cell voltage curve of a redox flow battery according to a difference in the SOC between the electrolyte input to a unit cell and the electrolyte output from the unit cell.

FIG. 4 is a graph showing a cell voltage curve of a redox flow battery according to the SOC difference between the electrolyte input to a unit cell and the electrolyte output from the unit cell. In FIG. 4, when a difference between the SOC of the electrolyte input to the unit cell 302 and the SOC of the electrolyte output from the unit cell 302 is 0%, 16%, or 32%, the tendency of a cell voltage curve of the redox flow battery is illustrated. In FIG. 4, the horizontal axis denotes the SOC of the redox flow battery and the vertical axis denotes the amount of a voltage needed to charge the battery at each SOC.

In FIG. 4, assuming that the curve on which the SOC difference between the input electrolyte and the output electrolyte is 0% is regarded to be a current electrolyte state, it may be seen that, as the SOC difference gradually increases to 16% and 32%, that is, as the pump speed decreases, a more amount of a voltage is needed for charging at the same SOC.

As a result, in addition to the power loss due to the resistance of the unit cell 302 that is proportional to the current applied to the unit cell 302, an additional power loss due to the pump speed occurs. Referring to FIG. 4, it may be seen that an increase of a necessary voltage according to the pump speed, that is, the power loss of the redox flow battery system, is maximum at opposite ends (0% and 100%) of the SOC, and minimum in the middle. Furthermore, as the pump speed increases, the power loss decreases.

The power consumption of the pumps according to the increase of the pump speed is proportional to a product of a differential pressure and a flow rate and the differential pressure is proportional to the flow rate, and thus the power consumption is proportional to the square of the flow rate.

Figure 5:
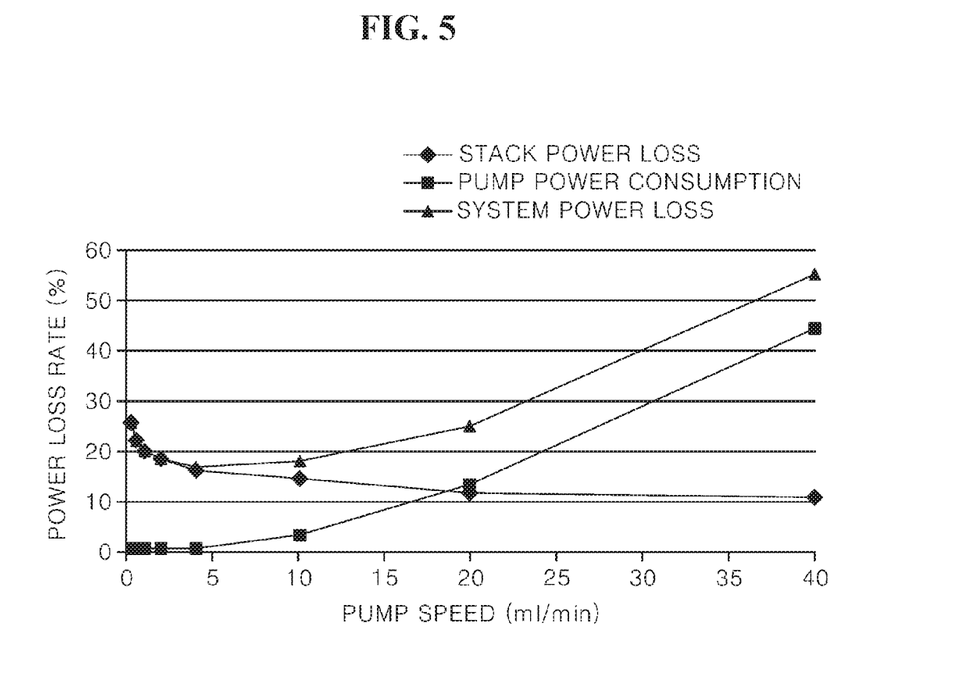
FIG. 5 is a graph showing a stack power loss, a pump power consumption amount, and a system power loss according to a pump speed.

FIG. 5 is a graph showing a stack power loss, a pump power consumption amount, and a system power loss according to the pump speed. In FIG. 5, the horizontal axis denotes the pump speed, and the vertical axis denotes the power loss or power consumption amount. Referring to FIG. 5, the stack power loss shows a decreasing tendency according to an increase in the pump speed, and the pump power consumption shows an increasing tendency according to an increase in the pump speed. Consequently, the system power loss of a redox flow battery system according to the pump speed may be expressed by a graph having one minimum value as shown in FIG. 5. As such, it may be seen that a specific pump speed at which the system power loss becomes minimum exists, and the pump speed does not proportional to the SOC of the redox flow battery. Accordingly, by increasing or decreasing the pump speed while measuring or calculating the system power loss in a periodic or non-periodic manner, the pump may be operated at an optimal speed at which the system power loss becomes minimum.

Figure 6:
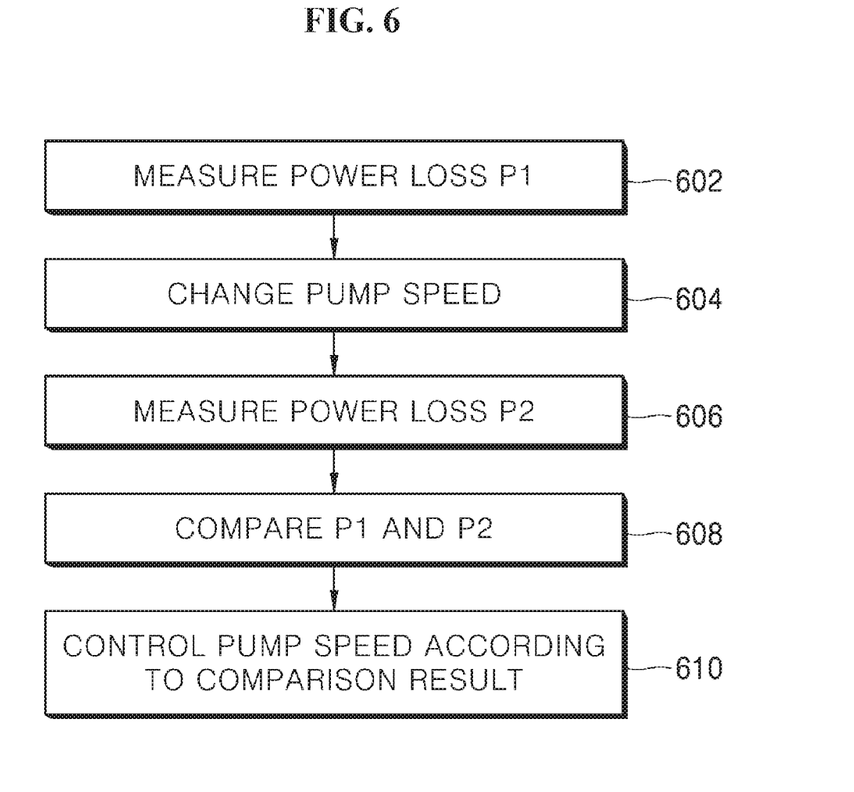
FIG. 6 is a flowchart of a method of controlling a pump speed of a redox flow battery, according to an embodiment.

FIG. 6 is a flowchart of a method of controlling a pump speed of a redox flow battery, according to an embodiment.

First, when a redox flow battery system is in operation, the calculation unit 216 calculates a first power loss P1 at a current pump speed of the redox flow battery system (602). As described above, the power loss of the redox flow battery system is defined to be a difference between the input power and the charging power during charging or a difference between the output power and the discharging power during discharge.

Then, the controller 218 changes the pump speed to a preset value (604), and after the pump speed is increased, the calculation unit 216 measures a second power loss P2 of the system.

After the pump speed is changed, when the first power loss P1 before the pump speed change and the second power loss P2 after the pump speed change are calculated, the controller 218 compares the size of the first power loss P1 with the size of the second power loss P2 (608). Then, the controller 218 controls the pump speed according to a result of the comparison of the first power loss P1 and the second power loss P2 (610).

If the controller 218 increases the pump speed in the operation 604 of FIG. 6, in the operation 610, the controller 218 continuously increases the pump speed when the first power loss P1 is greater than the second power loss P2, and decreases the pump speed when the first power loss P1 is less than or equal to the second power loss P2.

If the controller 218 decreases the pump speed in the operation 604 of FIG. 6, in the operation 610, the controller 218 continuously decreases the pump speed when the first power loss P1 is greater than the second power loss P2, and increases the pump speed when the first power loss P1 is less than or equal to the second power loss P2.

The controller 218 compares the first power loss P1 and the second power loss P2 as described above and repeatedly performs the pump speed increasing or decreasing process according to the comparison result, thereby controlling the pump speed to minimize the power loss of the redox flow battery system.

In the present embodiment, the power loss measurement and the pump speed control of the redox flow battery system, as illustrated in FIG. 6, may be repeatedly performed according to a preset time interval. Furthermore, the time interval may be freely changed according to a degree of a change in the power loss or the pump speed.

Furthermore, although not illustrated in FIG. 6, in another embodiment, the method may further include an operation of maintaining the pump speed, without change, when the measured power loss P1 or P2 is less than or equal to a preset first reference power. Furthermore, in another embodiment, the method may further include an operation of allowing a change of the pump speed only when the measured power loss P1 or P2 is greater than or equal to a preset second reference power.

Furthermore, although not illustrated in FIG. 6, in another embodiment, the method may further include an operation of terminating the charge or discharge of the redox flow battery when the pump speed reaches a preset upper limit speed. Furthermore, in another embodiment, the method may further include an operation of maintaining the pump speed when the measured power loss P1 or P2 decreases less than a preset third reference power and when the pump speed reaches a preset lower limit speed.

The present disclosure described above may be variously substituted, altered, and modified by those skilled in the art to which the present inventive concept pertains without departing from the scope and spirit of the present disclosure. Therefore, the present disclosure is not limited to the above-mentioned exemplary embodiments and the accompanying drawings.

What is claimed is:

1. A method of controlling a pump speed of a redox flow battery for transferring an electrolyte stored in an electrolyte tank to a cell stack, the method comprising:
   measuring at least one of an input power and an output power of the redox flow battery;
   measuring at least one of a charging power and a discharging power of the redox flow battery;
   calculating a power loss of the redox flow battery by using a difference between the input power and the charging power or a difference between the output power and the discharging power; and
   adjusting the pump speed according to the power loss.

2. The method of claim 1, wherein the adjusting of the pump speed comprises:
   increasing the pump speed;
   comparing a first power loss before the increasing of the pump speed and a second power loss after the increasing of the pump speed; and
   increasing the pump speed when the first power loss is greater than the second power loss, and decreasing the pump speed when the first power loss is less than or equal to the second power loss.

3. The method of claim 1, wherein the adjusting of the pump speed comprises:
   decreasing the pump speed;
   comparing a first power loss before the decreasing of the pump speed and a second power loss after the decreasing of the pump speed; and
   decreasing the pump speed when the first power loss is greater than the second power loss, and increasing the pump speed when the first power loss is less than or equal to the second power loss.

4. The method of claim 1, wherein the adjusting of the pump speed comprises:
   maintaining an existing pump speed when the power loss is less than or equal to a preset first lost power; and
   allowing a change of the pump speed only when the power loss is greater than or equal to a preset second lost power.

5. The method of claim 1, wherein the adjusting of the pump speed comprises:
   terminating charging or discharge of the redox flow battery when the pump speed reaches a preset upper limit speed; and
   maintaining an existing pump speed when the pump speed reaches a preset lower limit speed and the power loss decreases less than a preset third reference power.

6. An apparatus for controlling a pump speed of a redox flow battery for transferring an electrolyte stored in an electrolyte tank to a cell stack, the apparatus comprising:
   a measuring unit measuring at least one of an input power and an output power of the redox flow battery and measuring at least one of a charging power and a discharging power of the redox flow battery;

a calculation unit calculating a power loss of the redox flow battery by using a difference between the input power and the charging power or a difference between the output power and the discharging power; and a controller adjusting the pump speed according to the power loss.

7. The apparatus of claim 6, wherein the controller increases the pump speed, compares a first power loss before the increasing of the pump speed and a second power loss after the increasing of the pump speed, increases the pump speed when the first power loss is greater than the second power loss, and decreases the pump speed when the first power loss is less than or equal to the second power loss.

8. The apparatus of claim 6, wherein the controller decreases the pump speed, compares a first power loss before the decreasing of the pump speed and a second power loss after the decreasing of the pump speed, decreases the pump speed when the first power loss is greater than the second power loss, and increases the pump speed when the first power loss is less than or equal to the second power loss.

9. The apparatus of claim 6, wherein the controller maintains an existing pump speed when the power loss is less than or equal to a preset first lost power, and allows a change of the pump speed only when the power loss is greater than or equal to a preset second lost power.

10. The apparatus of claim 6, wherein the controller terminates charging or discharge of the redox flow battery when the pump speed reaches a preset upper limit speed, and maintains an existing pump speed when the pump speed reaches a preset lower limit speed and the power loss decreases less than a preset third reference power.

* * * * *